United States Patent

Schmitt et al.

(10) Patent No.: US 6,743,901 B1
(45) Date of Patent: Jun. 1, 2004

(54) PREPARATION OF LIQUID FORMULATIONS OF BASIC AZO DYES

(75) Inventors: Michael Schmitt, Worms (DE); Roland Merger, Bad Schoenborn (DE); Rainer Tresch, Maxdorf (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 32 days.

(21) Appl. No.: 10/410,397

(22) Filed: Apr. 10, 2003

(30) Foreign Application Priority Data

Apr. 11, 2002 (EP) .............................. 02008304

(51) Int. Cl.⁷ .................. C09B 33/04; C09B 67/34
(52) U.S. Cl. .................. 534/582; 534/614; 534/688
(58) Field of Search ................. 534/582, 614, 534/688

(56) References Cited

U.S. PATENT DOCUMENTS

| 4,656,256 A | * | 4/1987 | Colberg et al. ............. | 534/605 |
|---|---|---|---|---|
| 5,136,098 A | | 8/1992 | Gamblin ................... | 568/30 |

FOREIGN PATENT DOCUMENTS

| DE | 32 22 965 | 12/1983 |
|---|---|---|
| DE | 37 13 617 | 9/1988 |
| EP | 0 056 578 | 7/1982 |
| EP | 0 113 921 | 7/1984 |
| EP | 0 162 409 | 11/1985 |

* cited by examiner

*Primary Examiner*—Rona T. Powers
(74) *Attorney, Agent, or Firm*—Oblon, Spivak, McClelland, Maier & Neustadt, P.C.

(57) ABSTRACT

A process for preparing liquid formulations of dyes of the general formula I

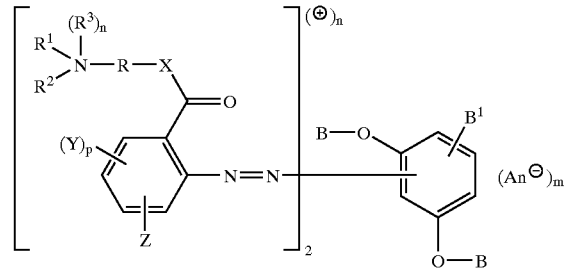

where the variables are as defined in the specification by diazotizing an amine of the formula II

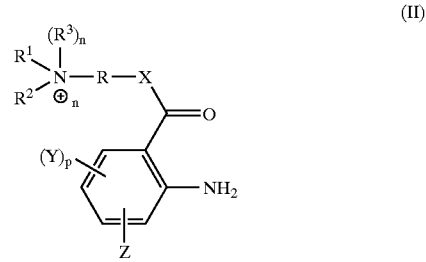

and then coupling the diazonium salt onto a compound of the formula III

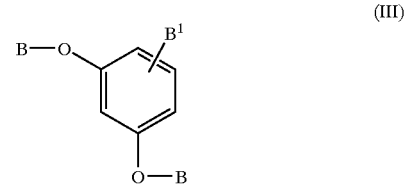

and also optionally adding solubilizing additives, which comprises effecting said diazotizing at a pH set to an acidic value using pure methanesulfonic acid or at least 20 mol % mixtures of methanesulfonic acid in monobasic acids.

8 Claims, No Drawings

PREPARATION OF LIQUID FORMULATIONS OF BASIC AZO DYES

DESCRIPTION

The present invention relates to a process for preparing liquid formulations of dyes of the general formula I

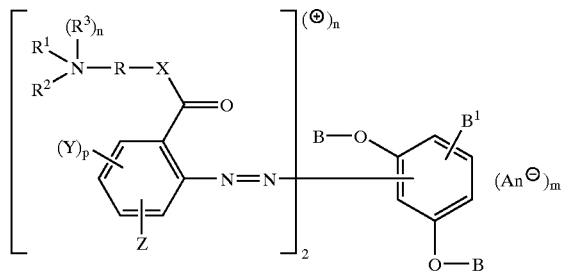

where

Y is chlorine or bromine,

Z is hydrogen, chlorine, bromine, sulfonic ester, nitro or optionally substituted sulfamoyl,

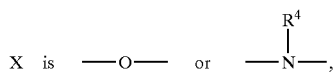

R is alkylene optionally interrupted by oxygen,

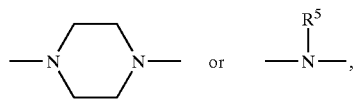

m is 1 or 2, n is 0 or 1, p is 0, 1 or 2, $An^{\ominus}$ is the equivalent of an anion, $R^1$ and $R^2$ are independently hydrogen, optionally substituted alkyl, alkenyl, cycloalkyl, aralkyl or aryl or combine with the joining nitrogen to form a heterocycle, $R^3$ is hydrogen or optionally substituted alkyl, B is hydrogen or $C_1$- to $C_4$-alkyl, $B^1$ is hydrogen, hydroxyl, $C_1$- to $C_4$-alkoxy or $C_1$- to $C_4$-alkyl, where $R^4$ is optionally substituted alkyl and $R^5$ is hydrogen or $C_1$- to $C_4$-alkyl, and the radical

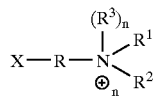

may also be an optionally substituted piperazine radical, by diazotizing an amine of the formula II

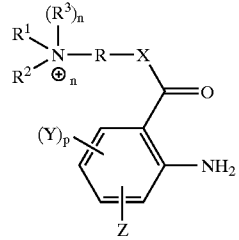

and then coupling the diazonium salt onto a compound of the formula III

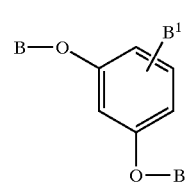

and also optionally adding solubilizing additives.

Basic azo dyes of the general formula I are known from EP-A-0 162 409. Liquid formulations with desired counterions such as acetate are prepared by dissolving the interveningly isolated dye in the desired acid such as acetic acid. The intervening isolation is necessary to free the dye of unwanted salt. However, intervening isolations are costly and inconvenient from a processing viewpoint, since they require additional crystallization, suction filtration and washing of the dye.

It is an object of the present invention to provide a process leading to stable dye solutions which can be used directly, without intervening isolation, as liquid formulations or as a basis therefor. Costly and inconvenient isolating operations of the dye shall be avoided. Moreover, the liquid formulations shall be minimally corrosive, if at all, with regard to alloyed steels.

We have found that this object is achieved by effecting said diazotizing at a pH set to an acidic value using pure methanesulfonic acid or at least 20 mol %, preferably ≧50 mol % and especially ≧80 mol % mixtures of methanesulfonic acid in monobasic acids.

Pure methanesulfonic acid is to be understood as meaning using methanesulfonic acid as sole acidifying agent. Monobasic acids can be monobasic mineral acids or carboxylic acids, such as hydrochloric acid, hydrogen bromide, formic acid, acetic acid, hydroxyacetic acid, aminoacetic acid, methoxyacetic acid, propionic acid, lactic acid, benzoic acid, benzenesulfonic acid and toluenesulfonic acid.

It is preferable to set the pH for the diazotization to an acidic value using pure methanesulfonic acid or at least 20 mol %, preferably ≧50 mol % and especially ≧80 mol % mixtures of methanesulfonic acid in monobasic carboxylic acids.

Preference is given to formic acid, acetic acid, propionic acid and lactic acid in particular. The pH for the diazotization is preferably set using a mixture of methanesulfonic acid in formic acid.

The acidifying is preferably carried out in such a way that the diazotization pH is in the range from 0 to 3, more preferably in the range from 1.0 to 2.5 and especially 2.

Preferably, the acidifying is effected using methanesulfonic acid alone. In this case, methanesulfonic acid is preferably used in a molar ratio in the range from 2.5/1 to 3.5/1 based on 1 mol of amine II. A larger methanesulfonic acid excess leads to an increased salt content and therefore is undesirable. Particular preference is given to using 2.8–3 mol of methanesulfonic acid per mole of amine II.

In general, the amine II will be dissolved in the mixture of water and methanesulfonic acid. Solubilizing additives often used in liquid formulations can, if desired, already be present in the reaction mixture. Solubilizing additives are specified hereinbelow and are water-miscible organic solvents and also ureas and lactams. Preferably, no solubilizing additives are used. Instead, it is preferable to use water as sole solvent for diazotizing and coupling for dye I.

The diazotization is effected using customary diazotizing agents such as nitrous acid which is formed from an alkali metal nitrite at an acidic pH. Useful diazotizing agents further include nitrosylsulfuric acid and the neopentylglycol ester of nitrous acid.

After excess nitrite has been destroyed, with sulfamic acid for example, the compound III is added, generally as an aqueous solution. This coupling is preferably carried out in the pH range from 3 to 6 and more preferably from 4 to 4.5. The pH should not exceed 7, since otherwise the dye will start to crystallize. However, if the solubilizing additives specified hereinbelow are added, the stability with regard to crystallization is distinctly increased.

The coupling pH is set using agents known to one skilled in the art. Useful bases for this include for example sodium acetate, aqueous sodium hydroxide solution, sodium carbonate, sodium bicarbonate and amines such as ethanolamine.

The diazotization is effected in a conventional manner at from −5 to 25° C. To carry out the coupling reaction, the reaction mixture is allowed to warm and is if necessary heated to 30° C. to complete the reaction.

The process is useful for preparing solutions of the dye of the general formula I.

Any alkyl and alkylene appearing in the abovementioned formula can be both straight-chain and branched. In substituted alkyl appearing in the abovementioned formula, possible substituents include for example hydroxyl and methoxy. The alkyl groups will then generally contain one or two substituents.

Useful anions $An^\ominus$ include for example monomethylsulfate, ethylsulfate, aminosulfonate, chloride, bromide, formate, acetate, hydroxyacetate, aminoacetate, methoxyacetate, propionate, lactate, benzoate, benzenesulfonate and toluenesulfonate.

Useful Z radicals in addition to those already mentioned include $C_1$–$C_4$ sulfonic esters whose alkyl radical is optionally substituted by mono- or di-($C_1$–$C_6$)-alkylamino or morpholino, such as $SO_2OC_2H_4N(CH_3)_2$, $SO_2OC_2H_4N(C_2H_5)_2$, $SO_2OC_2H_4N(C_3H_7)_2$, $SO_2OC_2H_4N(C_4H_9)_2$, $SO_2OC_2H_4N(CH_2CH_2)_2O$, $SO_2OCH(CH_3)CH_2N(CH_3)_2$, $SO_2OCH(CH_3)CH_2N(C_2H_5)_2$, $SO_2OC_4H_8N(CH_3)_2$ or $SO_2OC_4H_8N(C_2H_5)_2$.

Further examples of Z are sulfamoyl, phenylsulfamoyl or mono- or di-($C_1$–$C_4$)-sulfamoyl, whose alkyl radicals are optionally substituted by hydroxyl or methoxy, such as methylsulfamoyl, mono- or dimethylsulfamoyl, mono- or diethylsulfamoyl, mono- or dipropylsulfamoyl, mono- or dibutylsulfamoyl, mono- or dihydroxyethylsulfamoyl or N-methyl-N-hydroxyethylsulfamoyl.

Alkylene R has for example from 2 to 10 carbon atoms and is optionally interrupted from 1 to 3 times by oxygen, —$NR_5$— or

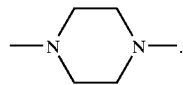

Specific examples are:

$C_2H_4$, $C_3H_6$, $CH(CH_3)$—$CH_2$, $CH_2$—$CH(CH_3)$—, $C_4H_8$, $CH(C_2H_5)$—$CH_2$, $C_6H_{12}$, $CH_2$—$C(CH_3)_2$—$CH_2$, —$C(CH_3)_2$—$CH_2$—$C(CH_3)_2$—, $C_2H_4OC_2H_4$, $C_3H_6OC_3H_6$, $C_3H_6OC_2H_4OC_3H_6$, $C_3H_6OC_4H_8OC_3H_6$, $C_3H_6OC_2H_4OC_2H_4OC_3H_6$, $C_2H_4NHC_2H_4$, $C_2H_4NHC_3H_6$, $C_3H_6NHC_3H_6$, $C_3H_6NHC_2H_4NHC_3H_6$, $C_3H_6NHC_6H_{12}NHC_3H_6$,

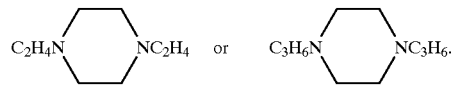

$R^1$ and $R^2$ are independently for example $C_1$–$C_{14}$-alkyl, with or without hydroxyl, $C_1$–$C_8$-alkoxy, N—$C_5$–$C_8$-cycloalkylamino, N,N-di-($C_1$–$C_4$-alkyl)amino substitution, $C_2$–$C_6$-alkenyl or $C_5$–$C_8$-cycloalkyl.

Specific examples of $R^1$ and $R^2$ in addition to those already mentioned include: methyl, ethyl, n-propyl, i-propyl, n-butyl, i-butyl, n-amyl, i-amyl, n-hexyl, i-hexyl, heptyl, octyl, 2-ethylhexyl, decyl, dodecyl, tridecyl, tetradecyl, 2-hydroxyethyl, 2- or 3-hydroxypropyl, hydroxybutyl, allyl, methallyl, cyclopentyl, cyclohexyl or cyclooctyl, N,N-dimethylaminoethyl, N,N-diethylaminoethyl, N,N-dipropylaminoethyl, N,N-dibutylaminoethyl, 3-(N,N-dimethylamino)-propyl, 3-(N,N-diethylamino)-propyl, 3-(N,N-dipropylamino)-propyl or 3-(N,N-dibutylamino)-propyl, N-cyclohexylaminoethyl, 3-(N-cyclohexylamino)-propyl, 3-(N-cyclooctylamino)-propyl, N-methyl-N-cyclohexylaminoethyl, 3-(N-methyl-N-cyclohexylamino)-propyl, benzyl, phenethyl, phenyl or tolyl.

$R^1$ and $R^2$ can combine with the joining nitrogen to form for example the radicals of the following 5- or 6-membered heterocycles which optionally contain nitrogen or oxygen as a further heteroatom and are optionally substituted, such as pyrrolidine, piperidine, morpholine, piperazine with or without methyl, ethyl, n- and i-propyl, n-, i-, sec-butyl, 2-hydroxyethyl, 2-aminoethyl, 2- or 3-hydroxypropyl, 2- or 3-aminopropyl substitution on the nitrogen, imidazole with or without methyl, ethyl, propyl or butyl substitution in position 2 and/or 4, or N-3-($C_1$–$C_{12}$)-alkyl- or vinylimidazole which may additionally be substituted by methyl, ethyl, propyl or butyl in position 2 and/or 4.

$R^3$ and $R^4$ are independently $C_1$- to $C_{12}$-alkyl which is optionally substituted by hydroxyl, $C_1$–$C_4$-alkoxy, chlorine or phenyl, such as methyl, ethyl, n- or i-propyl, n- or i-butyl, n- or i-amyl, n- or i-hexyl, octyl, 2-ethylhexyl, decyl, dodecyl, 2-hydroxyethyl, 2- or 3-hydroxypropyl, hydroxybutyl, benzyl, $CH_2CH_2(OH)CH_2Cl$ or $CH_2CH(OH)CH_2OH$.

Examples of $R^5$, B and $B^1$ include methyl, ethyl, propyl, isopropyl, butyl, isobutyl, sec-butyl and tert-butyl. $B^1$ may further be for example methoxy, ethoxy, propoxy or butoxy.

The

radical can also be a group of the formula

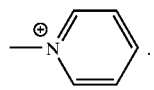

The process is preferred in the case of dyes I in which Z is hydrogen, chlorine or bromine.

$R^1$ and $R^2$ are each preferably for example:

methyl, ethyl, n-propyl, i-propyl, $C_2$- or $C_3$-hydroxyalkyl or cyclohexyl. Preferred heterocyclic radicals formed by $R^1$ and $R^2$ together with the adjoining nitrogen are derived from morpholine, piperidine, 4-methylpiperazine, 4-ethylpiperazine, 4-hydroxyethylpiperazine, 4-(2'-aminoethyl) piperazine, imidazole, 2-methylimidazole or 4-methylimidazole.

The process is preferred for dyes I in which $R^3$ is hydrogen, $C_1$- to $C_4$-alkyl, $C_2$- to $C_4$-hydroxyalkyl or benzyl, especially hydrogen, methyl, ethyl, hydroxyethyl or hydroxypropyl.

It is further preferred for dyes I in which $R^4$ is methyl, ethyl or hydroxyethyl. It is further preferred in the case of dyes I in which B and $B^1$ are independently selected from the group consisting of hydrogen and methyl.

The process is particularly useful for preparing compounds of the formula IV

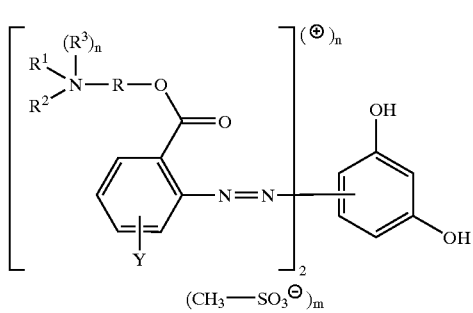

where R, $R^1$, $R^2$, $R^3$, n, m and y are each as defined above.

The process is particularly preferred for dyes IV in which Y is hydrogen or nitro and/or R is ethylene, propylene, isopropylene or butylene.

It is further preferred for dyes IV in which $R^1$ and $R^2$ are each hydrogen, methyl, ethyl, n- or isopropyl, n-, iso- or sec-butyl, methoxyethyl, cyclohexyl or combine with the joining nitrogen atom to form morpholinyl, piperidinyl, piperazinyl, N-methylpiperazinyl, N-ethylpiperazinyl or imidazolyl and $R^3$ is hydrogen, methyl, ethyl or hydroxyethyl.

The process according to the invention provides dye solutions which can be further used directly for liquid brands. The dyes are very soluble, so that they give stable liquid formulations. This method obviates costly and inconvenient isolating operations on the dye as well as additional purifying steps which give rise to wastewater. Furthermore, the liquid formulations obtained are only minimally corrosive with regard to alloyed steels, if at all.

If desired, the dye solutions are admixed with solubilizing additives. Such additives include for example water-miscible organic solvents such as $C_1$–$C_4$-alkanols, for example methanol, ethanol, propanol, isopropanol, butanol, isobutanol, sec-butanol or tert-butanol, carboxamides, such as N,N-dimethylformamide or N,N-dimethylacetamide, ketones or ketoalcohols, such as acetone, methyl ethyl ketone or 2-methyl-2-hydroxypentan-4-one, ethers, such as tetrahydrofuran or dioxane, mono-, oligo- or polyalkylene glycols or thioglycols having $C_2$–$C_6$-alkylene units, such as ethylene glycol, 1,2- or 1,3-propylene glycol, 1,2- or 1,4-butylene glycol, hexane-1,6-diol, diethylene glycol, triethylene glycol, dipropylene glycol, thiodiglycol, polyethylene glycol or polypropylene glycol, other polyols, such as glycerol or 1,2,6-hexanetriol, $C_1$–$C_4$-alkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl ether or triethylene glycol monoethyl ether, $C_1$–$C_4$-alkyl esters of polyhydric alcohols, γ-butyrolactone or dimethyl sulfoxide. Suitable solubilizing additives further include lactams, such as ε-caprolactam, 2-pyrrolidinone or N-methylpyrrolidin-2-one, urea, cyclic ureas, such as 1,3-dimethylimidazolidin-2-one or 1,3-dimethylhexahydropyrimid-2-one.

Preferred solubilizing additives are ureas, caprolactam, mono-, di- or trialkylene glycols having $C_2$–$C_4$-alkylene units and also oligo- and polyalkylene glycols having ethylene and/or propylene units and also their $C_1$–$C_4$-alkyl ethers and $C_1$–$C_4$-alkyl esters. Very particular preference is given to ethylene glycol, 1,2-propylene glycol, 1,3-propylene glycol, butyldiglycol, ureas and caprolactam.

Preferred liquid brands contain essentially

15–30% by weight of dyes I (based on the dye without counterion)

0–30% by weight of solubilizing additives based on the total amount of the aqueous liquid brand. Preference is given especially to liquid brands which contain no solubilizing additives. The liquid brands are useful, inter alia, for dyeing and printing cellulosic fiber materials such as wood-containing and wood-free paper materials.

The examples which follow illustrate the invention. Parts are by weight.

EXAMPLE 1

Preparation of diazo component: 187 parts of dimethylaminoethanol were added dropwise to 326 parts of isatoic anhydride in 1000 parts of diotine at 60° C. After the mixture had been stirred for 1 hour, the solvent was stripped off under reduced pressure and subsequently 402 parts of 2'-dimethylaminoethyl anthranilate passed over at 160° C./0.1 Torr.

275 parts of 2'-dimethylaminoethyl anthranilate were dissolved in 190 parts of water and 230 parts of methanesulfonic acid. The solution was cooled to 5° C., and 150 parts of an aqueous 40% by weight sodium nitrite solution were added dropwise. After 3 hours excess nitrite was destroyed by adding sulfamic acid. A solution of 44 parts of resorcinol in 160 parts of water was then added, the pH was brought to 5 with sodium acetate and the mixture was then stirred at room temperature for about 12 h. The result was a homogeneous solution. The dissolved dye conforms to the formula:

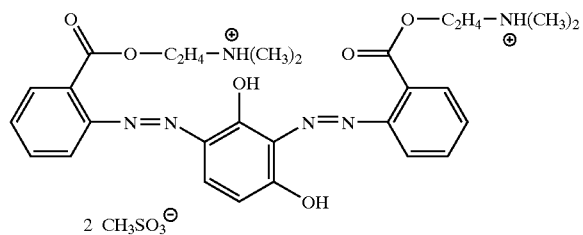

2 CH$_3$SO$_3^\ominus$

The process described similarly provides liquid preparations of further dyes which in terms of hue and affinity substantially correspond to Example 1.

TABLE

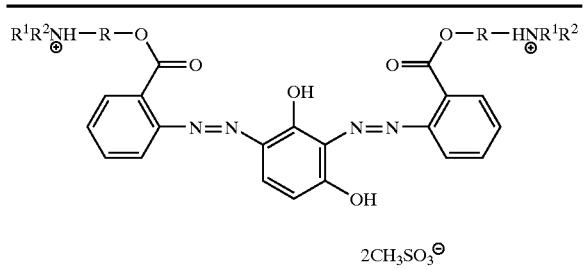

2CH$_3$SO$_3^\ominus$

| Example No. | —R—NR$^1$R$^2$H |
|---|---|
| 2 | —C$_2$H$_4$N(CH$_3$)$_2$ |
| 3 | —C$_2$H$_4$N(C$_2$H$_5$)$_2$ |
| 4 | —C$_2$H$_4$N(C$_3$H$_7$)$_2$ |
| 5 | —C$_2$H$_4$N(CH(CH$_3$)$_2$)$_2$ |
| 6 | —C$_2$H$_4$N(C$_4$H$_9$)$_2$ |
| 7 | —C$_2$H$_4$N(CH$_2$CH(CH$_3$)$_2$)$_2$ |
| 8 | —C$_2$H$_4$N(CHCH$_3$—C$_2$H$_5$)$_2$ |
| 9 | —C$_2$H$_4$NHCH$_3$ |
| 10 | —C$_2$H$_4$NHC$_2$H$_5$ |
| 11 | —C$_2$H$_4$N(CH$_2$)$_5$ |
| 12 | —C$_2$H$_4$N(CH$_2$)$_6$ |
| 13 | 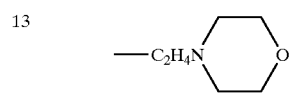 |
| 14 | 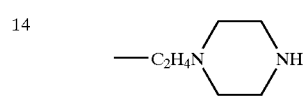 |
| 15 | 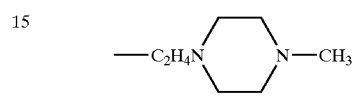 |
| 16 | 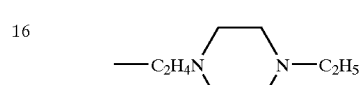 |
| 17 | 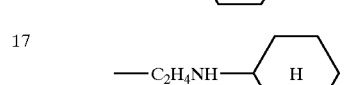 |

TABLE-continued

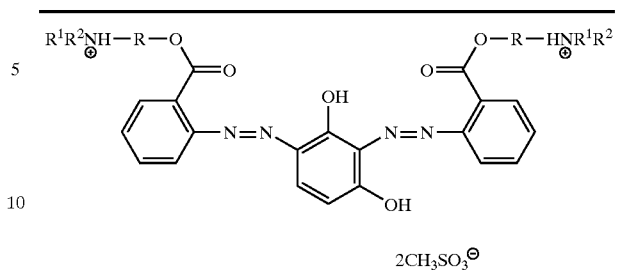

2CH$_3$SO$_3^\ominus$

| Example No. | —R—NR$^1$R$^2$H |
|---|---|
| 18 | 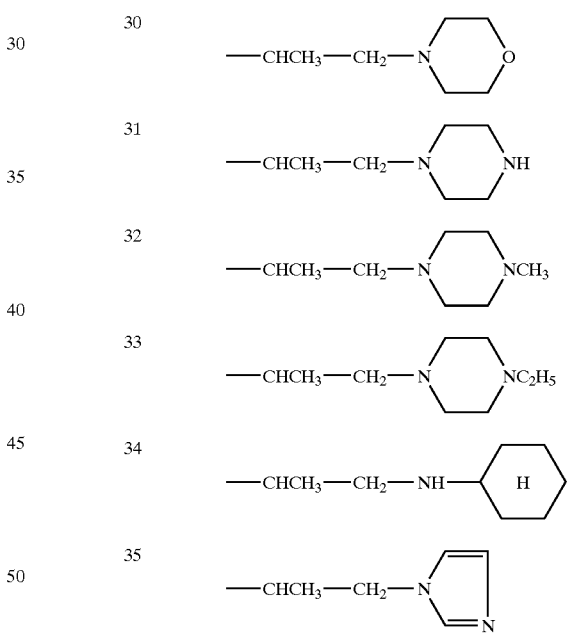 |
| 19 | —C$_2$H$_4$N(C$_2$H$_4$OCH$_3$)$_2$ |
| 20 | —C$_2$H$_4$N(C$_2$H$_4$OC$_2$H$_5$)$_2$ |
| 21 | —CHCH$_3$—CH$_2$—N(CH$_3$)$_2$ |
| 22 | —CHCH$_3$—CH$_2$—N(C$_2$H$_5$)$_2$ |
| 23 | —CHCH$_3$—CH$_2$—N(C$_3$H$_7$)$_2$ |
| 24 | —CHCH$_3$—CH$_2$—N(CH(CH$_3$)$_2$)$_2$ |
| 25 | —CHCH$_3$—CH$_2$—N(C$_4$H$_9$)$_2$ |
| 26 | —CHCH$_3$—CH$_2$—N(CH$_2$—CH(CH$_3$)$_2$)$_2$ |
| 27 | —CHCH$_3$—CH$_2$—N(CHCH$_3$—CH$_2$CH$_2$)$_2$ |
| 28 | —CHCH$_3$—CH$_2$—NHCH$_3$ |
| 29 | —CHCH$_3$—CH$_2$—NHC$_2$H$_5$ |
| 30 | |
| 31 | |
| 32 | |
| 33 | |
| 34 | |
| 35 | |

EXAMPLE 36

104 parts of 2'-dimethylaminoethyl anthranilate were dissolved in 160 parts of 85% by weight formic acid and 85 parts of 70% by weight methanesulfonic acid without heating. The solution was cooled to 0° C., and 82 parts of an aqueous 42% by weight sodium nitrite solution were added dropwise. After 3 hours excess nitrite was destroyed by adding sulfamic acid. 29 parts of resorcinol were added, the pH was brought to 3–3.5 with triethanolamnine and the mixture was subsequently stirred at room temperature for about 12 h. The result was a homogeneous solution.

We claim:

1. A process for preparing liquid formulations of dyes of the general formula I

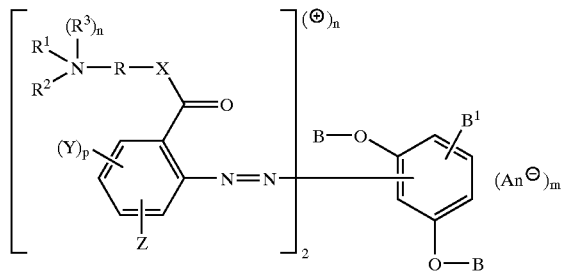 (I)

where

Y is chlorine or bromine,

Z is hydrogen, chlorine, bromine, sulfonic ester, nitro or optionally substituted sulfamoyl,

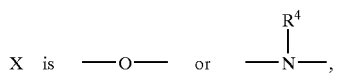

R is alkylene optionally interrupted by oxygen,

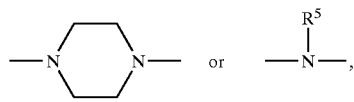

m is 1 or 2,
n is 0 or 1,
p is 0, 1 or 2,
$An^\ominus$ is the equivalent of an anion,
$R^1$ and $R^2$ are independently hydrogen, optionally substituted alkyl, alkenyl, cycloalkyl, aralkyl or aryl or cominbe with the joining nitrogen to form a heterocycle,
$R^3$ is hydrogen or optionally substituted alkyl,
B is hydrogen or $C_1$- to $C_4$-alkyl,
$B^1$ is hydrogen, hydroxyl, $C_1$- to $C_4$-alkoxy or $C_1$- to $C_4$-alkyl, where
$R^4$ is optionally substituted alkyl and
$R^5$ is hydrogen or $C_1$- to $C_4$-alkyl, and the radical

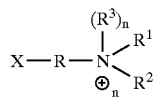

may also be an optionally substituted piperazine radical, by diazotizing an amine of the formula II

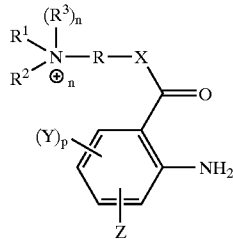 (II)

and then coupling the diazonium salt onto a compound of the formula III

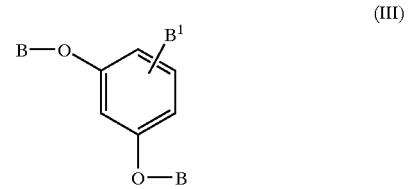 (III)

and also optionally adding solubilizing additives, which comprises effecting said diazotizing at a pH set to an acidic value using pure methanesulfonic acid or at least 20 mol % mixtures of methanesulfonic acid in monobasic acids.

2. A process as claimed in claim 1, wherein said diazotizing is effected at a pH set to an acidic value using methanesulfonic acid or at least 20 mol % mixtures of methanesulfonic acid in monobasic carboxylic acids.

3. A process as claimed in claim 1, wherein said diazotizing is effected at a pH of from 0 to 3 set using methanesulfonic acid.

4. A process as claimed in claim 1, wherein said diazotizing is effected at a pH set using a mixture of methanesulfonic acid in formic acid.

5. A process as claimed in claim 1, wherein said diazotizing is effected using methanesulfonic acid as sole acidifying agent.

6. A process as claimed in claim 5, wherein said methanesulfonic acid is used in a molar ratio in the range from 2.5/1 to 3.5/1 based on said amine II.

7. A process as claimed in claim 1, wherein said coupling is effected at a pH of from 3 to 6.

8. A process as claimed in claim 1, wherein said diazotizing and coupling to said dye I is effected using water as sole solvent.

* * * * *